Patented Oct. 23, 1934

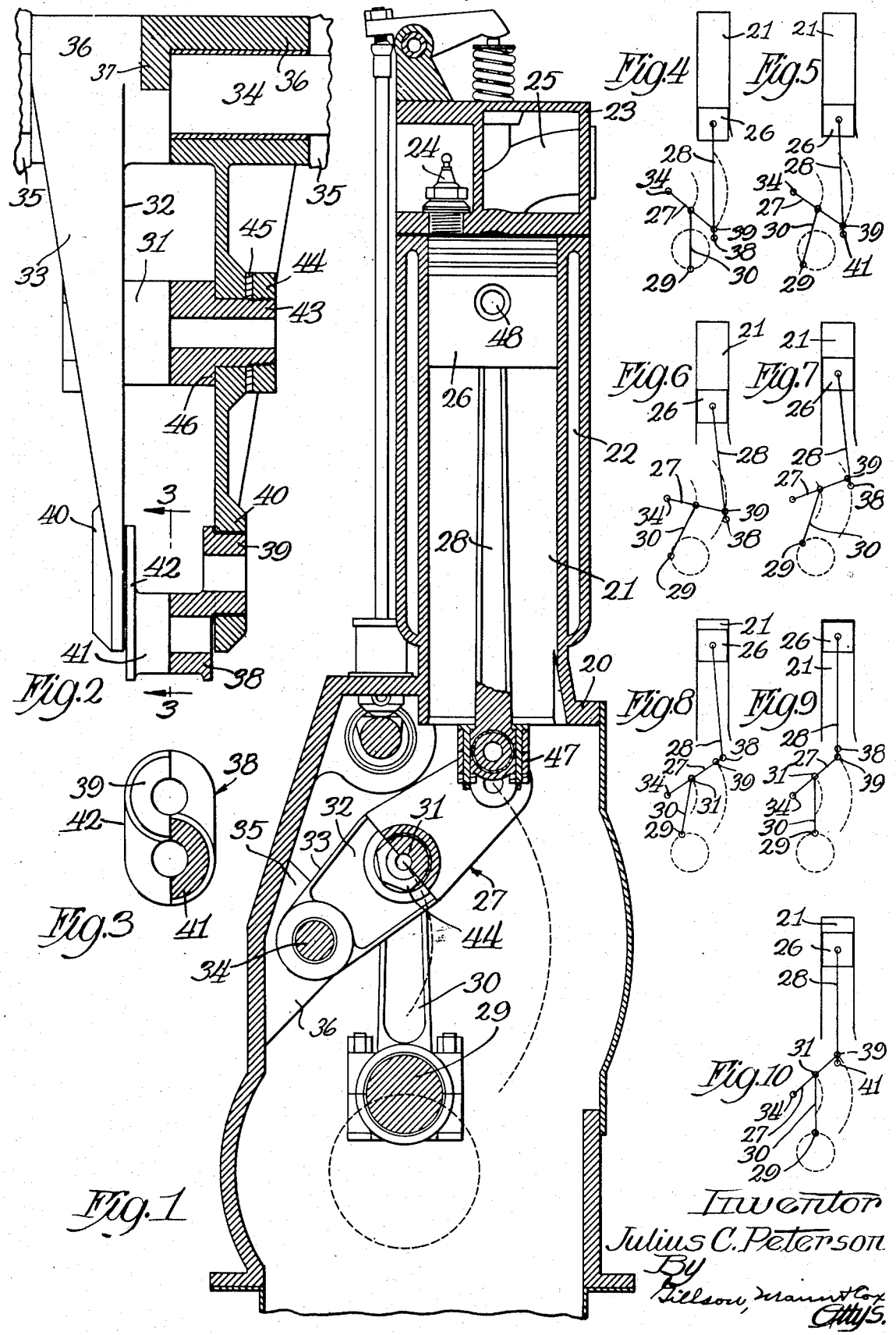

1,978,058

UNITED STATES PATENT OFFICE 1,978,058

VARIABLE STROKE LEVER ENGINE

Julius C. Peterson, Chicago, Ill.

Application May 1, 1930, Serial No. 448,972

4 Claims. (Cl. 123—78)

The principal object of this invention is to design a variable stroke lever type internal combustion engine which will develop maximum power from a given amount of fuel, but without increasing the size or weight requirements of the conventional engine.

Further objects and advantages will become apparent as the disclosure proceeds and the description is read in conjunction with the accompanying drawing, in which Fig. 1 is a vertical, transverse, section of an internal combustion engine illustrating one form of this invention, parts of the connecting rod and the power lever being broken away to expose the connecting link and the upper crank connecting rod bearing;

Fig. 2 is a view partly in section and partly in elevation showing details of the power lever;

Fig. 3 is a sectional view of the connecting link taken on the line 3—3 of Fig. 2;

Figs. 4 to 9 inclusive are diagrammatic views representing successive positions of the mechanism during the exhaust stroke; and Fig. 10 is a diagrammatic view showing the relative position of the parts at the end of the compression stroke and the beginning of the power stroke.

But this specific illustration and the correspondingly specific description are for the purpose of disclosure only, for it is realized that the invention may be embodied in a variety of forms and, therefore, reference should be had to the appended claims in determining the scope of the invention.

In the conventional internal combustion engine in which the piston stroke is kept constant, much power is lost by reason of the fact that the exhaust stroke does not completely scavenge the cylinder of the gaseous products of combustion. The result is that on the intake stroke, fuel will not be drawn into the cylinder until the piston has been moved downwardly a sufficient distance to reduce the pressure of the exhaust gases to somewhat below atmospheric pressure, and when admitted will be mixed with the residual gases producing a less combustible mixture.

Another disadvantage of the constant stroke engine is that by mixing the fuel with a portion of the exhaust gases, the former is caused to expand by the heat from the residual gases, thus reducing the total amount of fuel drawn into the cylinder and the volumetric efficiency of the engine.

In a variable stroke engine, these disadvantages are overcome by causing the piston to travel the full length of the cylinder on the exhaust and intake strokes, thus completely scavenging the cylinder of the products of combustion, and causing the fuel mixture to be drawn into the cylinder immediately upon the downward movement of the piston on its intake stroke. On the compression stroke, the piston moves to a point somewhat short of the top of the cylinder, forming a combustion chamber in which the fuel mixture is compressed and then ignited by suitable ignition means.

To illustrate the greater efficiency of a variable stroke engine, it will be found that a variable stroke engine having a compression ratio of six to one will develop approximately 26.5% more power than a constant stroke engine, and with a saving of about 22% in fuel consumption. This may be explained by the fact that the replacement of the exhaust gases which remain in the constant stroke engine at the beginning of the intake stroke by an equal amount of air would give a more inflammable mixture, while a mixture equally inflammable to that containing the residual exhaust gases would be obtained by mixing air with an appreciably smaller quantity of fuel.

Furthermore, the amount of fuel contained in the mixture, when the residual burned gas is absent, necessary to render the mixture inflammable, will be less than the amount of fuel required when the residual burned gas is present.

Referring now to the drawing, in which the invention is shown as applied to a lever type overhead valve motor, the reference character 20 designates an engine block having a plurality of cylinder bores 21 surrounded by a water jacket 22. The top of the engine block is fitted with a head 23 in which the spark plugs 24, intake and exhaust passages 25 and valves (not shown) are located. Inasmuch as this part of the engine is of the usual construction, a detailed description of these parts is deemed unnecessary, the only requirements being that the piston be free to travel the full length of the cylinder without obstruction, and that the compression space lie within the cylinder walls so that the cylinder can be completely scavenged upon the exhaust stroke. Of course, other constructions could be employed which would attain the desired results to a somewhat lesser degree as, for example, by having a part of the compression space in the head, but for the maximum efficiency, the preferred construction should be used.

The power actuating mechanism comprises a piston 26 which is adapted to reciprocate in the cylinder bore, a power lever generally designated 27 operatively connected to the piston by a connecting rod 28, and a crank shaft 29 receiving its power impulses from the lever 27 through a crank connecting rod 30.

The main advantage of this type of lever engine over the ordinary engine is that for an engine of given cylinder volume, the total length of the crank shaft, if extended, is less inasmuch as the crank throw is relatively small. These factors combine to reduce the centrifugal force, and, therefore, the motor vibration; to lessen the stress in the various parts; and to enable a lighter and less expensive crank shaft to be used.

Inherent disadvantages, however, are also found in this type of motor, since the two connecting rods of the lever engine will have somewhat greater mass than the single connecting rod of the ordinary engine of equal power, but as the respective movements of the rods are quite dissimilar, there will be no material difference in the power required to move them. In order that the advantages of a shorter and lighter crank shaft be not lost to the lever engine, the mass and inertia of the lever must be kept small. Moreover, there are three more bearings in the power transmitting mechanism of the lever engine than in the ordinary type and it is, therefore, necessary that the lever be of such construction that it will be of small mass yet having the requisite strength, and that there will be no tendency or possibility for the moving parts to be thrown out of their normal plane of operation.

This is accomplished in this engine by providing a lever made up from a pair of symmetrical lever arms securely held together by a bearing bolt 31 which forms the upper bearing for the crank connecting rod 30. The deep web 32 of the lever gives the necessary strength to withstand the force of the power stroke and is reinforced by marginal ribs 33 which taper towards the swinging end of the lever.

The lever is mounted on a shaft 34 which is journaled in brackets 35, and in order to prevent any swinging movement of the lever from side to side, the arms of the lever are provided with a large pivot bearing 36 so that the entire system is kept rigidly confined to a vertical plane of operation. This construction gives maximum strength with minimum mass and lends itself to fabrication in steel, or a lighter material such as aluminum alloy. The two arms are locked against relative rotation by a lug 37 on one of the pivot bearings fitted into a complementary notch in the other.

The connecting rod 28 is joined to the lever 27 by a floating eccentric or connecting link 38, in this case shown as a single throw crank shaft. The ends of the shaft 39 are journaled in annular enlargements 40 at the free end of the lever, and are connected to the lower connecting rod bearing 41 by crank arms 42.

One end of the bearing bolt 31 is reduced at 43 and threaded to receive a nut 44 which securely holds the bolt in place assisted by a lock washer 45. The correct distance between the arms is maintained by the shoulders 46 on the bearing bolt so that the connecting link is free to rotate in response to the forces acting upon it. It will be noted that the upper end of the crank connecting rod 30 need not be provided with bearing caps inasmuch as the bearing bolt 31 may be inserted through the upper connecting rod bearing from one side of the lever. It is, however, necessary to provide the lower end of the piston connecting rod 28 with bearing caps 47.

The operation of an engine incorporating this invention does not materially differ from the conventional constant stroke engine, the only difference being in the movement of the piston, the piston connecting rod and the connecting linkage. Advantage is taken of the momentum of these parts, particularly the piston and piston connecting rod to cause them to vary the piston stroke to produce the desired results.

Assuming that the engine is running, Fig. 4 shows the various parts in the positions they take at the end of the power stroke and at the beginning of the exhaust stroke. The motion of the crank pin in its circular path is clockwise, as indicated by the arrowhead on the crank pin circle. The crank pin is at the bottom of its circle and the piston is in its lowest position, the crank pin of the connecting link also being in its lowest position, the radius of this crank being in the same plane as that containing the axis of the piston connecting rod.

In effect, the piston connecting rod and connecting link may be regarded simply as a jointed connecting rod, one joint being relatively long and the other relatively short. In the position under consideration, the two joints are folded together, so that the effective length of the connecting rod is shortened by an amount equal to twice the length of the shorter joint, or equal to the diameter of the circle of the connecting link crank pin.

The exhaust valve is already slightly open. While the valves are not shown in the figures, it is assumed that they are present and that they function in the usual manner.

With the exception of the crank connecting rod, all the parts of the power transmission mechanism, and the piston also, have come to a momentary stop in the positions shown. The upward thrust of the crank connecting rod, as the crank pin moves to the left, overcomes the inertia of the various parts and after one-eighth revolution of the crankshaft they take the positions shown in Fig. 5. The downward pressure of the piston and piston connecting rod, due to the inertia of these parts and to the pressure of the burned gas on the head of the piston, and the balancing upward pressure at the swinging end of the lever, cause the piston connecting rod and connecting link to remain "folded", with the effective length of the connecting rod as short as possible, as was the case in Fig. 4.

During the next one-eighth revolution of the crankshaft, the same conditions prevail and at its completion the parts have the positions shown in Fig. 6. The vertical component of the velocity of the crank pin has been increasing up to this point, and the velocity of the piston and piston connecting rod have also been increasing. During the next one-eighth revolution of the crankshaft, near the point where the axis of the crank connecting rod becomes tangent to the crank pin circle, the velocity of the piston and piston connecting rod attains its maximum and these parts have acquired considerable momentum. The motion of the crank connecting rod thereafter acts to retard the movement of the swinging end of the lever. Unless checked in some way, the piston and piston connecting rod will continue, due to their momentum, to move upwardly at their maximum velocity. They are retarded by the pressure of the burned gas in the cylinder against the head of the piston and by the friction between the walls of the cylinder and the piston, but as the exhaust valve is open and the friction is very small, the decrease in velocity of the piston and piston connecting rod, due to these causes, is relatively small. Centrifugal force tends to throw the lower end of the piston connecting rod to the right, while the motion of the swinging end of the lever to the left pulls the upper, or shaft, end of the connecting link to the left.

In consequence, the radius of the connecting link leaves the plane containing the axis of the piston connecting rod and the crank pin of the connecting link is no longer on dead center, so that the piston and piston connecting rod are permitted to continue their upward motion. After three-eighths revolution of the crankshaft, then, the parts have the approximate positions shown in Fig. 7.

While the swinging end of the lever loses velocity, due to retardation imposed by the movement of the crank connecting rod, the piston and piston connecting rod continue their movement upward at a smaller rate of retardation than that of the lever.

The same forces mentioned, though in diminishing amount, continue to cause the rotation of the connecting link. As the connecting link is not on dead center, the upward pull of the piston connecting rod has a lever arm through which to act to assist in the rotation of the connecting link. After seven-sixteenths revolution of the crankshaft, then, the parts will have the approximate positions shown in Fig. 8. During the last sixteenth of a revolution, completing the half revolution of the crankshaft for the exhaust stroke, the remaining momentum of the piston and piston connecting rod is used up in ascending the rest of the way to the limit of their motion, the lower end of the piston connecting rod being pulled to the left until its axis and the radius of the connecting link are again in the same plane. The "jointed connecting rod" is thus unfolded and the piston is stopped at a point where its head fails to reach the cylinder head by only the amount of clearance provided for in the construction, as shown in Fig. 9.

Thus all the burned gas has been forced from the cylinder except that contained in the clearance space and in the small spaces around the valves and spark plug.

At the start of the intake stroke the parts will have the same positions as at the end of the exhaust stroke, as shown in Fig. 9. The piston is pulled downwardly by the piston connecting rod and connecting link, these two latter parts remaining in their extended position until the piston and piston connecting rod have reached their maximum velocity. Thereafter the action is similar to that on the exhaust stroke. The connecting link moves from dead center and the momentum of the piston and piston connecting rod cause them to move downwardly with less retardation than that of the lever, which is held back by the movement of the crank connecting rod. The effective length of the piston connecting rod is reduced to its shortest and at the end of the intake stroke, the various parts have the positions shown in Fig. 4.

As the cylinder contained practically no burned gas at the start of the intake stroke, and as the piston travelled the entire length of the cylinder, being in its lowest position at the end of the stroke, practically the entire volume of the cylinder has been filled with fresh fuel mixture taken in through the intake valve.

On the compression stroke both valves are closed. Except that the pressure on the head of the piston is greater, the action up to the point where the piston and piston connecting rod reach their highest velocity, is exactly the same as on the exhaust stroke as shown in Fig. 7. At this point the piston has travelled upwardly considerably more than half the total length of the cylinder and, in an engine having any compression ratio now in common use, the pressure on the head of the piston will exceed forty pounds per square inch. Consequently, in the latter part of the stroke, the momentum which carried the piston and piston connecting rod upwardly on the exhaust stroke, will be used up in compressing the fuel mixture. The pressure in the cylinder is continually rising while the momentum of the parts is continually decreasing; consequently at the lower engine speeds the momentum will be insufficient to compress the fuel mixture and the thrust of the crank connecting rod will have to do part of the work.

At the higher speeds, since momentum increases as the square of the velocity, it may be sufficient to cause the piston and piston connecting rod to get slightly ahead of the lever temporarily, but since the pressure in the cylinder is approximately one hundred pounds to the square inch, at the end of the stroke, in an engine having a compression ratio as low as five to one, the piston and piston connecting rod will fall back with the connecting rod in the "folded" position, as it was at the start of the stroke. At the end of the compression stroke, then, the piston connecting rod will have its shortest effective length, with the crank of the connecting link down. The various parts will have the positions shown in Fig. 10.

The compression space will have a length equal to twice the crank throw of the connecting link, plus the clearance. The volume of the compression space will be in accordance with whatever compression ratio the engine is designed for. The engine shown in the drawings has an approximate compression ratio of six to one.

On the power stroke, the parts start from the positions they occupied at the end of the compression stroke, as shown in Fig. 10. The pressure on the head of the piston keeps the connecting rod "folded" throughout the stroke. At the end of the stroke, the parts have the positions shown in Fig. 4. The power stroke is the same as that of the usual engine.

In other words, what happens is that the connecting rod "folds" or "unfolds" in response to the forces acting upon it. At some engine speeds, it is possible that the connecting link would function otherwise than in the precise manner which has just been described, but in all events whether the connecting link is caused to rotate clockwise or counterclockwise, the desired results will be accomplished, since there is a constant tendency for the parts which are in unstable equilibrium to find stable equilibrium.

It is understood that the invention is not confined to the particular form of eccentric used to secure the variable stroke of the piston or to its location on the swinging end of the lever, for the advantages of this invention could be equally well obtained by providing a similar eccentric on the wrist pin 48. It is also possible that a floating eccentric could be inserted at the upper end of the crank connecting rod 30, although such a construction would not be as effective as at the lower end of the piston connecting rod 28.

What I claim is:

1. In an internal combustion engine, an engine block provided with a cylinder bore, a cylinder head closing the bore, a piston in the cylinder, a lever, a crank shaft, a crank connecting rod between the crank shaft and the lever, and a piston connecting rod between the piston and the lever, one end of which is provided with an eccentric bearing.

2. In an internal combustion engine, an engine block provided with a cylinder bore, a cylinder head closing the bore, a piston in the cylinder, a lever, a crank shaft, a crank connecting rod between the crank shaft and the lever, and a piston connecting rod between the piston and the lever, the lower end of which is connected to the lever by a single throw crank shaft.

3. In an internal combustion engine of the type including a piston, a connecting rod, a crank shaft and a lever intermediate the crank shaft and the piston connecting rod, the combination therewith of a single throw crank shaft journaled in the lever, the crank pin bearing of which is adapted to receive the lower end of the piston connecting rod.

4. In an internal combustion engine, the combination of a piston, a crank shaft, a lever intermediate the two, and means connecting the piston to the lever and the lever to the crank shaft, said lever comprising two similar arms having a fixed pivot at one end, and bearing means between the two arms including a floating eccentric adapted to receive the piston-lever connecting means.

JULIUS C. PETERSON.